Oct. 26, 1943.  P. F. K. ERBGUTH  2,332,627
KINETIC RESET REGULATOR
Filed Feb. 1, 1941
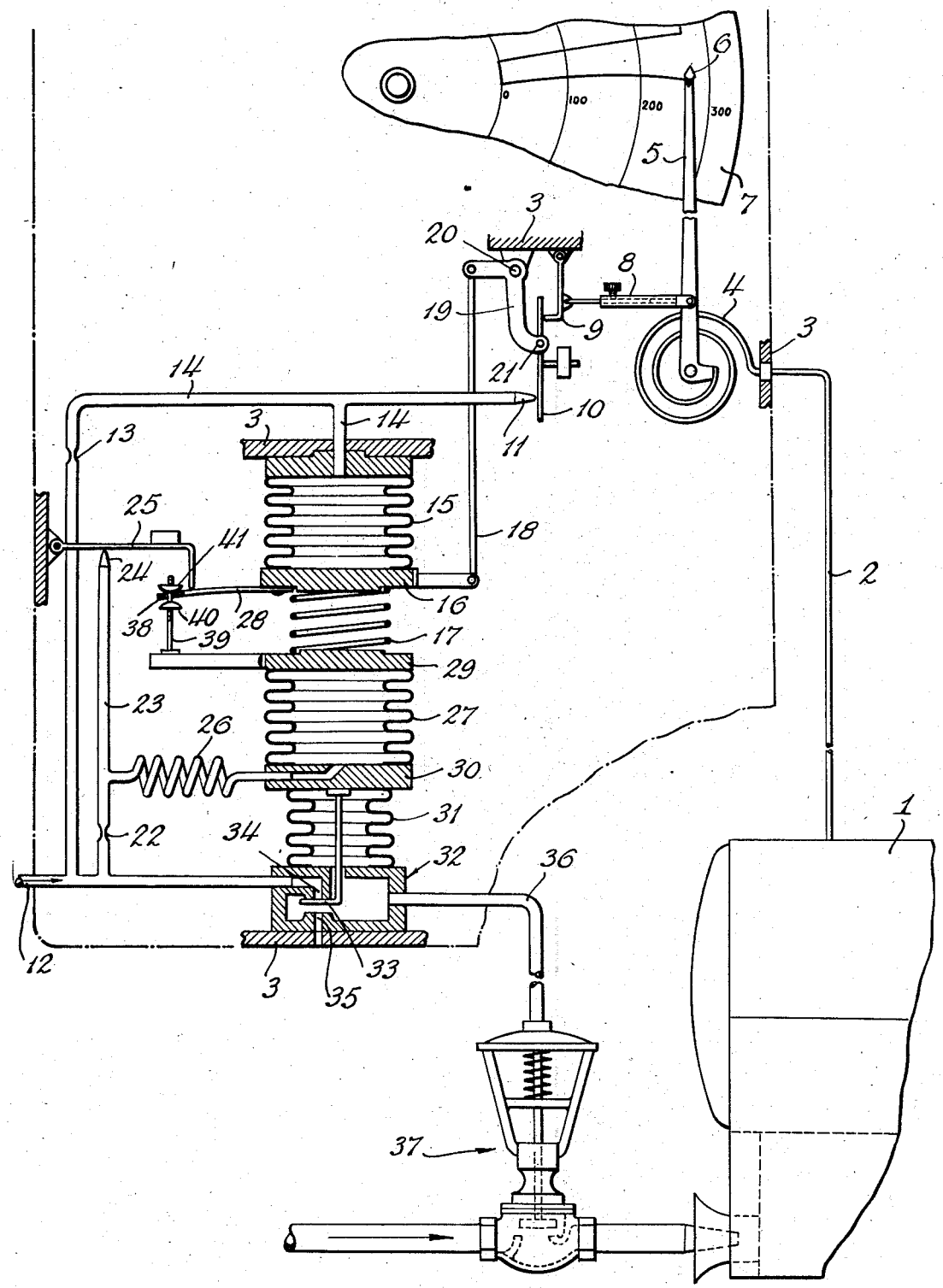
WITNESS:
George Du Bon
INVENTOR.
PAUL F. K. ERBGUTH
BY
E. S. Smith
AGENT Patented Oct. 26, 1943

2,332,627

UNITED STATES PATENT OFFICE 2,332,627

KINETIC RESET REGULATOR

Paul F. K. Erbguth, Brooklyn, N. Y., assignor to Charles J. Tagliabue Mfg. Co., Brooklyn, N. Y., a corporation of New York Application February 1, 1941, Serial No. 377,071

15 Claims. (Cl. 236—85)

The invention relates to fluid-operated regulators for maintaining the value of a variable physical condition such as pressure, flow, voltage or the like at a fixed value. It particularly relates to such regulators which have reset-type devices for enabling the momentary response of a regulator to a change of the measured value of a variable to be small relative to its ultimate value.

I am aware that others have provided fluid-operated regulators with resets in which both the amount and rate of the departure were used. I have provided an improved reset-type regulator which is simple, comparatively free from the effects of changes of pressure of fluid supply, and which has a novel means for usefully limiting the extent of operation of the reset at crucial times as when starting up a plant which is regulated by such a regulator. In general, my invention relies upon the use of a positional or kinetic reset means which is believed to be novel and which cooperates well with the reset-limiting means.

A main object of the invention accordingly is to provide a reset-type regulator which is simple, accurate, and has a minimum number of points where either mechanical friction or lost motion can occur. Another object is to provide an improved reset device which is novel, relies upon position only and which hence may be known as a kinetic type of reset device. A related object is the provision of such a regulator with means for practically eliminating the effects of ordinary variations of the supply pressure.

These and other objects of my invention will appear to those skilled in the art from the accompanying drawing and specification, in which is illustrated and described an embodiment of the invention, it being my intention to claim all that I have disclosed which is inventive, new and useful.

The figure is a front elevation and shows somewhat diagrammatically a complete regulator attached to a boiler plant whose steam pressure is the measured variable and which pressure is regulated by controlling the flow of fuel gas to the furnace of the boiler plant. The instrument proper is the portion in which the novelty is believed to reside and is partially shown in section, especially as to the kinetic reset and limiting devices.

In the drawing, the pressure in boiler 1 depends upon the temperature of the furnace of the boiler plant. The boiler pressure is the variable which is to be regulated and is carried by pressure pipe 2 to bourdon 4 which is secured to base 3 of the instrument. Pen arm 5 is attached to the other end of the bourdon and is provided at its upper end with pen 6 which operates upon the surface of chart 7 which is driven by a clock motor (not shown).

Proportional component means

Link 8 pivotally connects pen arm 5 with lever 9 which is pivotally mounted upon base 3. The lower end of lever 9 abuts counterweighted flapper 10 which is respectively movable by lever 9 and by the counterweight away from and toward the end of nozzle 11. The arrangement is such that the pen arm is free to move in either direction so that the force due to bourdon 4 suffices to cause the position of pen 6 to accurately correspond with the value of the pressure. A setting means diagrammatically shown is generally required and that of Bast Patent 1,988,775 may be used since said patent shows a generally similar flapper-actuating arrangement to that herein described and somewhat diagrammatically shown. Supply line 12 supplies air to nozzle 11 through throttling restriction 13 and line 14.

The pressure in line 14 depends upon the position of the flapper 10 relative to nozzle 11. Bellows 15 is also connected by pipe 14 with nozzle 11 so that the force upon its sealing disc 16 depends upon the pressure in nozzle 11. Compression spring 17 abuts the lower face of disc 16 and opposes the force due to the pressure within bellows 16 so that the position of disc 16 accordingly depends both upon such pressure and upon the position of the other end of spring 17.

Disc 16 is pivotally connected by link 18 with one arm of bell crank 19 which is pivoted on pivot 20. The other arm of bell crank 19 carries pivot 21 for flapper 10, the arrangement being such that the position of flapper 10 relative to its nozzle 11 depends both upon the measured value of the pressure as indicated by the position of pen arm 5 and by the position of disc 16. The effect of this followup for the movement of disc 16 is to lower the sensitivity of the response of the pressure in nozzle 11 to a change of the value of the measured variable which is shown by way of example in this case as the pressure in boiler 1. It is recognized in this art that such a followup acts to lower the sensitivity of the response of the pressure to a measured value.

The bellows 15 and its described associated means constitute what is known as a proportional fluid system which provides an initial correspondence of a governing pressure with the measured value of the variable which results in stable control within a regulating band whose width can decrease only with an increase of the initial sensitivity without adding a reset component. In general, an increase of the initial sensitivity tends to cause instability or hunting. However, a reset substantially to a point may be added by a reset fluid system which introduces a rate component which depends upon the rate of change of the measured variable and allows the initial sensitivity to remain low while the ultimate sensitivity may be raised to a high value but so gradually as not to cause hunting.

Reset component means

Throttling restriction 22 connects conduit 23 with nozzle 24 from which air escapes at a rate which is governed by the position of flapper 25 relative to the end of this nozzle. Flexible resistance tubing, or resistor, 26 connects conduit 23 with the interior of bellows 27 whose capacity cooperates with resistor 26 to have a delayed response of bellows 27, following a movement of flapper 25, in a direction to oppose the movement of this flapper, or in other words, bellows 27 acts to push this flapper away from the nozzle when this flapper 25 is pushed toward the nozzle 24 by an increase of pressure in bellows 15.

The arrangement by which this is done includes arm 28 which is affixed to disc 16 and which is arranged to raise flapper 25 relative to its nozzle 24. The lower end of spring 17 rests upon the upper face of disc 29 of bellows 27 so that an increase of pressure in bellows 15 immediately lowers weighted flapper 25 toward nozzle 24. This causes an opposing air pressure to gradually build up in bellows 27 which further compresses spring 17 and hence raises disc 16 to a position in which flapper 25 further clears nozzle 24 but is yet close enough to this nozzle to have a throttling effect upon the escaping air. The arrangement thus far described gives a regulating action in which both the departure and the rate of departure have an effect. The provision of the kinetic means shown and described is believed to be both novel and of unquestionable utility.

Disc 30 forms the bottom end of bellows 27. The resultant or net force on the disc 30 is due to the proportional-component pressure in bellows 15, which at least approximately follows the changes in the measured value of the variable and to the reset-component pressure in bellows 27 which lags behind such changes to give a reset effect.

As earlier noted, a flexible tubing resistor 26 connects conduit 23 with disc 30 and the interior of bellows 27. This construction allows the frictionless movement of disc 30 vertically through its operating range. The upper end of bellows 31 supports disc 30 and the lower end of bellows 31 rests on the stationary casing of relay 32 and is pressure-sealed to this casing. The valve 33 of relay 32 is affixed to the upper end of bellows 31 so that the disc 30 moves valve 33 to normally occupy a throttling position between its supply port 34 and its exhaust port 35 through which air escapes to the atmosphere. This relay is somewhat diagrammatically shown since any free-acting valve as, e. g., a ball-type valve, may be used as long as there is no appreciable lost motion or mechanical friction present. Supply port 34 is connected with supply line 12.

The air pressure within the casing of relay 32 and within bellows 31 is built up by the action of valve 33 until it creates an upward force on disc 30 which balances the resultant force due to the pressures in bellows 15 and 27 which respectively depend upon the departure and the rate of departure from the set point of the measured value of the variable being regulated. Pipe 36 carries the air under this pressure to the diaphragm top of final control valve 37 which is of the direct-acting spring-opposed diaphragm type. This valve controls the flow of gas to the burner of the furnace of boiler 1.

This arrangement tends to free the pressure in pipe 36, and hence that of the fuel gas, from the effect of changes of air pressure in supply line 12 since there is a prompt response both of bellows 15 and of bellows 31 to a change of pressure in supply line 12. When the rate of change is high, the flapper 25 moves outside of the narrow range of throttling and the reset moves at full speed until the throttling range is reentered, thus avoiding any wasted time during which the regulation is not as effective as it should be. Of course there is a slight tendency to lower the stability momentarily, but this is less objectionable than to have the regulator ineffective on severe changes when it is most needed.

Reset limit means

When starting up a conventional reset regulator with the usual plant, there is an objectionable tendency for the reset device to go to a limit and to become loaded up with a pressure which is far outside of the normal operating range. This overswing permits the rate of supply of fuel gas, e. g., to seriously overswing the set control point. To obviate this difficulty, arm 28 is made flexible and provided with a hole 38 through which a slender rod 39 passes vertically. The lower end of rod 39 is rigidly attached to disc 29 by a bracket fixture. This rod is provided with a lower button 40 and an upper button 41 both of which are adjustably affixed to rod 39 as by a screw thread. These buttons are set only a short distance apart which, however, permits the kinetic reset to operate normally without interference from bellows 27. However, when bellows 27 is abnormally extended in either direction, a button moved by its disc 29 acts directly on flexible arm 28. In other words, the position of the disc 16 normally governs the positioning of flapper 25 but, when bellows 27 reaches a limit in either direction, bellows 27 takes over the regulation since one of buttons 40 and 41 then abuts spring 28. The movement of bellows 31 is not sufficient to upset this action, bellows 31 having been provided, as earlier mentioned, to move valve 33 through a relatively short distance and to take a steady throttling position for any given force exerted upon disc 30.

Operation

While the operation of this regulator is believed to be clear to one skilled in the art from the foregoing description of the device itself, still the following description of the operation may help to clarify some feature of novelty: A slight increase in the steam pressure in boiler 1 above its usual value is carried by pipe 2 to bourdon 4 whose free end moves pen arm 5 to the right so that pen 6 moves upscale on chart 7. Link 8 moves to the right to tend to withdraw the lower end of lever 9 from counterweighted flapper 10. This permits flapper 10 to turn through a slight angle and to decrease the distance between flapper 10 and its nozzle 11 so that the pressure in line 14 immediately increases to a new value. This increase of pressure expands bellows 15 and lowers disc 16 against its compression spring 17 and, through link 18, turns bell crank 19 through a small counterclockwise angle. This moves pivot 21 to the right and moves flapper 10 to the right or away from nozzle 11 so that flapper 10 reaches a position which momentarily corresponds with that of pen arm 5 but with a much lower sensitivity than would be the case if this followup were not provided. This followup means as a whole consequently tends to increase the stability immediately following a change.

When disc 16 drops, it lowers arm 28 and flapper 25 so that there is less leakage of air from nozzle 24 than before the change with the result that the pressure in conduit 23 promptly rises to a higher value. This increase of pressure causes a flow of air through resistor 26 to bellows 27 which expands to compress spring 17 to raise disc 16 nearly, but not quite, to its earlier position.

It takes considerable time for the pressure in bellows 27 to build up and the rate of increase of this presure slows down as the pressure in bellows 27 approaches that in conduit 23. It is to be kept in mind that at the same time while the pressure is increasing in bellows 27, the expansion of bellows 27 and the consequent compression of spring 17 is increasing the upward force against disc 16 so that the flapper 25 is being gradually raised during this time. The result is that the pressure in nozzle 24 and in conduit 23 tends to asymptotically decrease to a final value which corresponds with that of the pressure in bellows 15 and hence corresponds with the value of the measured variable. At the same time, the pressure in bellows 27 is increasing so that the effect of the mechanical interconnection of bellows 27 with flapper 25 through compression spring 17 is to reduce the amount of the change of pressure below what would otherwise be the case. In other words, the arrangement of this reset means also provides a powerful stabilizing factor.

However, this increase of pressure in bellows 27 also tends to push disc 30 downwardly so as to compress bellows 31 and lower valve 33 to increase the distance from its supply port 34 and to decrease that from its exhaust port 35.

The resultant increase of pressure in relay 32 brings control valve 37 to a more nearly closed position in which this control reduces the flow of gas to the burner in the furnace of the boiler plant 1. After a time necessary to decrease the temperature of the furnace and to bring this decrease of temperature to the boiler of this boiler plant, the pressure in the boiler 1 will gradually decrease and tend to restore the boiler pressure nearly but not quite to its original value.

By providing a sufficiently high value of resistor 26, the bellows 27 may pace the value of the regulated pressure and of that in bellows 15 to nearly the set value. Actually, the resistance is ordinarily made less than this so that the regulator tends to force the return of the pressure at a somewhat earlier time than the plant tends to return if the resistance of resistor 26 was so high as to provide a purely non-hunting or critically damped return. As aforementioned, the kinetic reset device is believed to be novel as is the use of the compression spring in connection with the reset device, an arrangement which permits a considerable lowering of the sensitivity of regulation immediately following a change of the value of the regulated variable.

In general, the usual sort of reset operation has been followed for small or gradual changes by the regulator whose operation has thus far been described and whose arm 28 is not flexible and not provided with rod 39 having adjustably attached buttons 40 and 41. However, the usual reset gives a continuous resetting instead of the following resetting of this device: When flapper 25 is moved very far relative to its nozzle 24, the pressure changes in conduit 23 tend to occur at a substantially fixed rate, i. e. there is a discontinuity when the flapper 25 abuts nozzle 24 or passes outside of the effective throttling range, which occurs when the flapper is more than one-quarter of the diameter of the nozzle distant therefrom.

However, the usual reset causes the regulator, when starting up, to have its reset bellows 27 reach an extreme position due to having a protracted duration of a subnormal boiler pressure so that the pressure in bellows 15 is too low and also so that flapper 25 is raised from nozzle 24 so that bellows 27 tends to collapse and to have nearly atmospheric pressure therein. When the plant is started up, the pressure in bellows 27 lags considerably behind that in bellows 15 (or up to 90° with a steadily hunting regulated plant) with the result that the boiler pressure must seriously overswing the control point while bellows 27 is being loaded up with air to its normal operating pressure.

In some cases, as when paper pulp is being digested, such an overswinging of the control point would ruin the entire charge. To keep this from happening is the purpose of the rod 39, buttons 40 and 41 and the flexibility of arm 28. When the boiler is shut down, as by an additional valve on the fuel gas line (not shown), the steam pressure drops and pen arm 5 moves link 8 to the left to force flapper 10 away from the throttling zone of nozzle 11. The resultant fall of pressure in bellows 15 raises disc 16, arm 28 and flapper 25 away from the throttling band of nozzle 24. The resultant heavily-damped decrease of pressure in bellows 27 lowers its disc 29 to expand spring 17 until the upper button 41 depresses flexible arm 28 to gradually lower flapper 25 to more heavily throttle the air from nozzle 24. For the duration of the shut-down, this action maintains the pressure in bellows 27 at a value within the operating range instead of letting this pressure become excessively low which would paralyze the resetting-action as long as abnormal pressure existed in bellows 27 which would be for a considerable time after the boiler had been started up again and its pressure exceeded that set.

With the reset-limiting device operating as described, the boiler plant is started up again as by opening the stated shut-down valve. As soon as the boiler pressure rises to within the regulating range, pen arm 5, link 8 and lever 9 move to the right to permit flapper 10 to move to the left to reenter its throttling range relative to nozzle 11. The resultant increase of pressure in bellows 15 lowers disc 16 against the opposing force of spring 17. This causes flexible arm 28 to straighten and clear button 41 so that flapper 25 is lowered to reduce the flow of air from nozzle 24. The pressure in bellows 27 immediately starts to rise and the operation is as earlier described for ordinary operation. Thus it is seen that regulation is never lost since the pressure in bellows 27 never departs seriously from that corresponding with a limiting position of bellows 27 instead of being so lowered that it would require an undue time for the proper pressure in bellows 27 to be built up after the boiler pressure has finally again risen into the regulating range. The point is that this regulator takes over the regulation smoothly and at the earliest possible moment with the result that the initial overswing is substantially eliminated.

It is apparent to those skilled in the art that some such provision is necessary on account of the compressibility of the fluid in bellows 27, which fluid in this case is air. It is generally recognized that some sort of release of the reset is necessary in such case. The limiting means provided works simply and effectively in connection with the disclosed kinetic reset device to reliably keep the regulator from being paralyzed following any continued exposure to abnormal measured values of the variable under regulation.

Various modifications will doubtless occur to those skilled in the regulating art upon an examination of this disclosure. For one example, it is evident that a rigid connection of discs 16 and 29 may be substituted for the compression spring 17 for instruments which do not require the reset-limiting means 38—41, a construction for which claims occur in my copending application S. N. 373,469 which was filed Jan. 7, 1941. For another example, a spring may be substituted for bellows 31 and relay 32 operated as described by disc 30 where no compensation is required for changes in the pressure of the air supply. Again, where the final control valve 37 may be very small, this valve may be actuated directly by disc 30 although the travel of disc 30 must be kept small to provide a satisfactory reset since, basically, it is the constancy of position of disc 30 which determines the closeness with which disc 16 and hence flapper 10 are restored to their respective normal positions. In any case there will be a slight change in the control point due to the throttling range of flapper 25 relative to its nozzle 24 which is preferably of small diameter to provide high sensitivity at this point.

The terms and expressions which I have employed are used as terms of description and not of limitation, and I have no intention, in the use of such terms and expressions, of excluding any equivalents of the features shown and described and portions thereof, but recognize that various modifications are possible within the scope of the invention claimed.

I claim:

1. In a fluid-operated instrument for governing a controller for the value of a variable physical condition of a plant and which includes an element which is sensitive to the value, the combination of a first, or proportional-component, fluid system which is operatively connected with said element to have said element govern the pressure in said system in accordance with changes in the sensed value of the variable and which system includes a portion which is sensitive to this pressure; a second, or reset-component, fluid system which includes means operated by said portion for changing the pressure in said second system, a resistor and a second portion sensitive to the pressure in the second system and having appreciable capacity and connected by said resistor with the rest of the second system to cause a delayed response of the second portion within predetermined limits to a response of the first portion to a change of pressure in the first system, the second portion being operatively connected with said means to modify the stated operation of said means in a direction to gradually increase the over-all sensitivity of regulation toward a predetermined ultimate value, said controller being governed jointly by said portions; and a reset limiting device which, only when the response of the first portion is protractedly such as to tend to cause the response of the second portion to reach either of its limits, operatively connects the second portion with said means to operate said means when said response is near said limits to maintain said response within said limits.

2. In a fluid-operated regulating instrument for governing a controller for the value of a variable physical condition of a plant and which includes a meter having a portion whose position corresponds with the measured value of the variable, the combination of a proportional-component fluid system including a valve which is operatively connected with said meter portion to have the valve govern the pressure in the system in accordance with the departure of the measured value of the variable from a set value thereof, and said system also including a movable portion whose position is affected by said pressure; a reset-component fluid system including a second valve whose position is affected by the position of said movable portion, a resistor and a second movable portion having appreciable capacity and whose position is affected by the pressure in said second portion, said resistor being located between said second portion and the rest of the second fluid system to cause a momentary reduction of the sensitivity of regulation soon after a change and a resetting delayed movement of the second movable portion within reset limits upon a change in the position of the first movable portion, the second portion being operatively connected with the second valve to modify the position thereof in accordance with that of said second portion in a direction to gradually restore to its ultimate value the stated momentarily reduced sensitivity of regulation, and said controller being governed jointly by said portions in accordance with their positions; and a reset limiting means which, only when the position of the first portion is protractedly such as to tend to cause the second portion to reach an operating limit, is operatively connected with the second portion to be actuated thereby to dominatingly affect the position of the second valve when the second portion is near a limit in a direction to maintain the second portion within its operating range of positions by altering the pressure within the reset system.

3. The combination set forth in claim 1 in which said means comprises a high-sensitivity value and the reset limiting device is actuated by said second portion and is constructed and arranged relative to said means to normally be operatively disconnected from said valve and to be operatively connected with said valve near a reset limit to provide at least a sharp change in the pressure-governing by said means of the second system near a reset limit.

4. In a fluid-operated instrument for governing a controller for the value of a variable physical condition of a plant and which includes an element which is sensitive to the value, the combination of a first, or proportional-component, fluid system which is operatively connected with said element to govern the pressure in said system in accordance with changes in the sensed value of the variable and which system includes a portion which is sensitive to this pressure; and a second, or reset-component, fluid system which includes means, operated by said portion for changing the pressure in said second system, a resistor and a second portion sensitive to the pressure in the second system and having appreciable capacity and connected by said resistor with the rest of the second system to cause a delayed response of the second portion within predetermined limits to a response of the first portion to a change of pressure in the first system, the second portion being operatively connected with said means to actuate the same to modify the stated operation of said means in a direction to gradually increase the ultimate sensitivity of regulation toward a predetermined ultimate value, said controller being governed jointly by said portions.

5. In a fluid-operated regulating instrument for governing a controller for the value of a variable physical condition of a plant and which includes a meter having a part whose position corresponds with the measured value of the variable, the combination of a proportional-component fluid system including a valve which is operatively connected to said meter part to be actuated thereby to govern the pressure in said system in accordance with the departure of the measured value of the variable from a set value thereof and said system also including a movable portion whose position is affected by said pressure; a reset-component fluid system including a second valve whose position is affected by the position of said movable portion to alter the pressure in the second named system, a resistor and a second movable portion having appreciable capacity and whose position is affected by the pressure in said second movable portion, said resistor being located between said second movable portion and the rest of the second fluid system to cause a momentary reduction of the sensitivity of regulation soon after a change and a resetting delayed movement of said second movable portion within reset limits, the second movable portion being operatively connected with the second valve to actuate the same to modify the position thereof in accordance with that of said second portion in a direction to gradually restore to its ultimate value the stated momentarily-reduced sensitivity of regulation, and said controller being governed jointly by said movable portions in accordance with their positions; and a resilient connection between the said portions whereby the position of one affects that of the other and the movement of the second movable portion increases the effective capacity and hence the lag of the movement of the second movable portion behind that of the first movable portion.

6. In a fluid-operated instrument for governing a controller for the value of a variable physical condition of a plant and which includes an element which is positioned in accordance with the value, the combination of a first fluid system including a first bellows having a portion which is sensitive to the pressure therein and a first means for changing said pressure in accordance with changes in the position of said element; a second fluid system including a second bellows having a portion which is sensitive to the pressure therein, a second means for changing the pressure in this system, and a resistor connecting the second bellows portion with the rest of this system; a resilient member connecting said bellows portions to have a movement of one bellows portion affect the other; a linkage for operating the second named means by the first bellows portion in a direction to ultimately raise the sensitivity of regulation; and a relay actuated by the second bellows portion to govern the controller in accordance with the force produced upon the resilient member by both bellows portions.

7. The combination set forth in claim 6 in which the second means is of high sensitivity and includes a part that is freely movable over a range having a fixed limit and is biased toward said limit; said linkage comprises a flexible arm having one end affixed to said sensitive portion of the first bellows and constructed to have another portion clear said part within one range of operating positions of said first bellows portion and actuate said part within a complemental range; and including a third means comprising a relatively rigid arm having one end affixed to said sensitive portion of the second bellows and its other end constructed to coact with said other end of the flexible arm to constitute therewith a loose-link permitting free actuation of said second means part by said flexible arm due to the movement of said first bellows portion only as long as said second bellows portion is within a normal range of operating positions determined by said loose-link means and, when said second bellows portion is outside of said normal range, positively actuating said other end of the flexible arm by said other end of the more rigid arm to then govern, in accordance with the position of said second bellows portion, the actuation of the second means part in a direction to tend to keep the position of said second means portion within its said normal range.

8. A fluid-operated instrument for governing a controller for the value of a variable physical condition of a plant comprising, in combination, a meter for the variable having an element which is biased toward a position which corresponds with the departure of the measured value from a set value of the variable; a first fluid system including a first highly sensitive valve which is connected with said element to be actuated thereby, a first bellows having a movable end, and a followup kinetic connection from said movable end to said valve to lower the sensitivity of the pressure-governing of said system; a second fluid system including a second highly sensitive valve, a second bellows having a movable end, and a resistor connecting said second bellows with the rest of said second system; a spring connecting the said movable ends of said bellows whereby its force is affected by the movement of both said ends; a flexible arm affixed to the movable end of the first bellows and disposed adjacent an operating portion of the second valve, and a rigid rod carrying a stop affixed to the movable end of the second bellows, said stop being disposed adjacent said arm, the arrangement being such that, upon a movement of the movable end of the second bellows beyond a normal limit of operation, the stop abuts the flexible arm and springs said arm into contact with the stated operating portion of the second valve to cause this valve to alter the pressure in the second bellows in a direction to keep the movable end of this bellows within its operating range; and a relay means actuated to govern the controller in accordance with the value of the force of said spring in a direction to bring the measured value toward the set value of the variable under regulation.

9. The combination set forth in claim 8 in which the controller is pressure-governed and the relay means includes a third bellows having a movable end carrying the opposite end of the second bellows from that stated to be movable, and a valve actuated by said movable end of the third bellows, the third bellows being connected with the relay to be sensitive to the relay-controlled pressure which governs said controller.

10. In a fluid-operated instrument for governing a controller for the value of a variable physical condition of a plan by a meter's movable element which is positioned in correspondence with the measurement of the value, the combination of a first fluid system including a highly sensitive valve which is operatively connected with said element to be actuated thereby in accordance with the difference of the measured value from a set value of the variable, a first bellows pressure-connected with said valve and having a movable end, and a followup kinetic connection from said movable end to said valve to lower the sensitivity of the pressure-governing of said system; a second fluid system including a second highly sensitive valve, a second bellows having a movable end, and a resistor connecting said second bellows with the rest of said second system; a resilient means connecting said movable ends of said bellows to exert a substantially equal force upon each of said movable ends which force both depends upon and affects the position of each of said movable ends; a means operatively connecting the movable ends of said bellows with said second valve to normally actuate the latter in accordance with the position of the movable end of the first bellows and, under abnormal conditions, to actuate said second valve in accordance with the position of the movable end of the second bellows in a direction to tend to restore normal conditions; and a relay means operated by a portion of the instrument which is positioned in accordance with the pressures in both said bellows and hence with said force to govern the controller in a direction to tend to bring said measured value toward said set value.

11. A fluid-operated instrument for governing a controller for the value of a variable physical condition of a plan comprising, in combination, a meter for the variable having an element whose position corresponds with the difference of the measured value of the variable from a set value of the variable; two valves which are operatively connected with said element to have their positions affected by that of said element; two bellows each pressure-connected with a respective one of said valves and having a movable end; a mechanical connection between said movable ends of said bellows constructed to exert a substantially equal force upon said movable ends and in a direction to oppose the movement of said ends due to the pressures respectively affecting them; a mechanical followup connection between one of said movable bellows ends and its said valve effective to promptly lower the sensitivity of response of the pressure acting upon the last mentioned bellows upon a change in the position of said element, the other end of such bellows being fixed; a resistor in the stated pressure-connection between the other of said bellows and its said valve to cause such bellows to respond more slowly to said change; a resilient mounting for the other end of the last mentioned bellows to permit movement of such end in accordance with the value of said force; and a relay for governing the controller in accordance with the position of the last mentioned bellows end and hence jointly with the pressures affecting each of said bellows.

12. The combination set forth in claim 11 in which the stated mechanical connection between the movable ends of said bellows is resilient whereby the relative movement of such ends is permitted, and including a lost-motion means actuated by the movable end of the delayed-action bellows and operatively connected to its said valve to dominate the position thereof only when the pressure acting on such bellows reaches either of two limits which substantially correspond with predetermined limits of the extension of such bellows to maintain such pressure within said limits.

13. In the governing system of an instrument for stably regulating the position of a final element in accordance with that of an initial movable element, the combination of a proportional-component means in which the value of a governing physical condition is controlled in accordance with changes in the position of said initial element, a reset-component means in which the value of a governing physical condition is controlled in accordance with the rate of change of the position of the initial element and including a portion whose position varies between predetermined limits in accordance with the changes in the value of the stated condition therein, and a lost-motion means operatively connected with and actuated by said portion of the reset-component means only when said portion is near either of its said limits to modify the value of the stated condition therein to keep said value within values substantially corresponding with said limits when otherwise it would have exceeded them.

14. In an instrument for stably governing the position of a final element in accordance with that of an initial movable element, the combination of a proportional-component servomotor means having a first motor having a movable part, a high-sensitivity pilot for said motor and actuated by the initial element, and a followup connecting the movable part of the motor with the pilot to lower the sensitivity of the response of the motor to a change of position of the initial element to provide a low-sensitivity response of the motor soon after said change; a reset-component servo-motor means having a second motor having a movable part, a second high-sensitivity pilot for the second motor and actuated by the movable part of the first motor, a means operatively connecting the movable part of the second motor with the second pilot and with the first motor to gradually return the movable part of the first motor substantially to a normal position; and a means for governing the positioning of the final element in accordance with the positions of both said movable portions.

15. In a fluid-operated instrument for governing a controller 37 for the value of a variable physical condition of a plant 1 and which includes an element 4 sensitive to said value, the combination of a first fluid-system including a pilot valve 10 which is operatively connected with said element 4 to be actuated by said element to govern the pressure in said system in accordance with the sensed value of the variable and a bellows 15 sensitive to the pressure in said system; a second fluid-system including a second pilot valve 25 operatively connected with a movable end 16 of said bellows to be normally operated thereby, a resistor 26, and a second bellows 27 sensitive to the pressure in said second system, said second bellows having appreciable capacity and being connected by said resistor with a portion 24 of said second system whose pressure is directly affected by said second pilot valve; and a spring 17 connecting said movable end of the first bellows with a movable end 29 of the second bellows, the arrangement being such that an expansion of the first bellows upon an increase of the pressure in the first system causes the second pilot valve to operate to gradually change the pressure in the second system and to cause a movement of said movable end 29 of the second bellows 27 in a direction to reduce the movement of the movable end 16 of the first bellows 15 and hence to gradually increase the sensitivity of regulation to an ultimate predetermined value; means 31 supporting the other end 30 of the second bellows 27 to cause the position of the last mentioned bellows-end 30 to depend upon the pressures in both of said bellows, and a means operatively connecting the last-mentioned bellows-end 30 with said controller 37 to govern the position of said controller; and a lost-motion linkage 39 and 40 actuated by the first named movable end 29 of the second bellows 27 and arranged relative to the second pilot valve to actuate the latter only when the first mentioned movable end 29 of the second bellows is near either of two predetermined limits of its movement and in a direction to maintain said first mentioned movable end of said second bellows within said limits.

PAUL F. K. ERBGUTH.